(12) United States Patent
Chen

(10) Patent No.: US 6,491,266 B1
(45) Date of Patent: Dec. 10, 2002

(54) FOLDABLE STAND WITH ROTATABLE LEGS FOR CAMERA OR MICROPHONE

(75) Inventor: Mike Chen, Taipei (TW)

(73) Assignee: Yoga Electronics Co., Ltd., Taipei (TW)

( * ) Notice: Subject to any disclaimer, the term of this patent is extended or adjusted under 35 U.S.C. 154(b) by 0 days.

(21) Appl. No.: 10/073,359

(22) Filed: Feb. 13, 2002

(51) Int. Cl.$^7$ ............... F16M 11/00; F16M 11/32; F16M 11/38; A47B 91/00
(52) U.S. Cl. ............ 248/163.1; 248/166; 248/170; 248/188.7; 248/519; 248/528
(58) Field of Search ............... 248/519, 528, 248/188.7, 166, 170, 163.1, 157; 396/428

(56) References Cited

U.S. PATENT DOCUMENTS

| | | | |
|---|---|---|---|
| 4,763,866 A | * 8/1988 | Sinchok ............ | 248/188.7 |
| 5,072,910 A | * 12/1991 | May ............... | 248/170 |
| 5,290,004 A | * 3/1994 | Frost et al. ........ | 248/188.7 |
| 5,509,629 A | * 4/1996 | Sassmannshausen et al. .... | 248/ |
| | | | 169 |
| 6,283,421 B1 | * 9/2001 | Eason et al. ........ | 248/170 |

OTHER PUBLICATIONS

US Patent Publication 2002/0088907, Phillips Jul. 11, 2002.*

* cited by examiner

Primary Examiner—Ramon O. Ramirez
Assistant Examiner—Amy J. Sterling
(74) Attorney, Agent, or Firm—Morgan, Lewis & Bockius LLP

(57) ABSTRACT

A stand for holding a camera or a microphone, includes a cylindrical tube unit having an inner wall surface defining an axially extending post-receiving chamber to telescopically receive a post therein. A positioning element is fixed on the tube unit. First, second and third support legs have upper portions sleeved on an outer wall surface of the tube unit. The second and third support legs are rotatable relative to the tube unit in such a manner that the second and third support legs can be stacked below the first support leg when the stand is in a storage position and that the first, second and third support legs engage the positioning element and are angularly spaced apart from one another when the stand is disposed at a position of use.

9 Claims, 4 Drawing Sheets

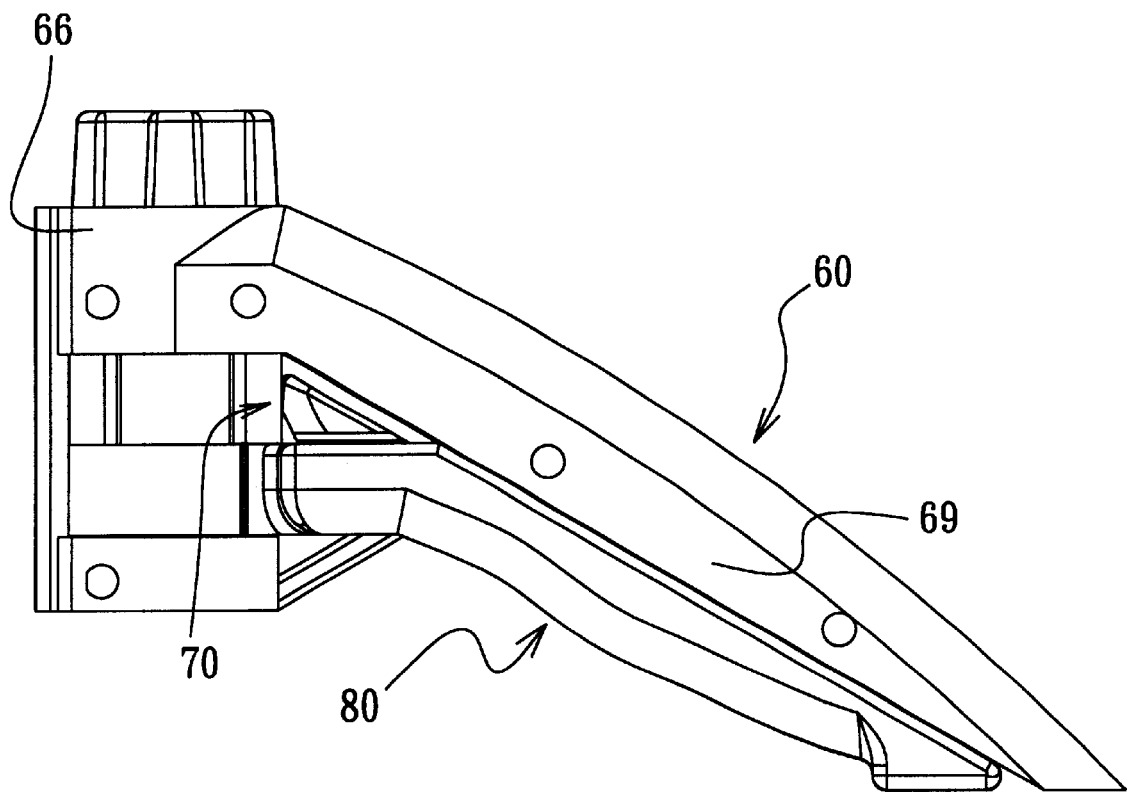
F I G. 3(B)

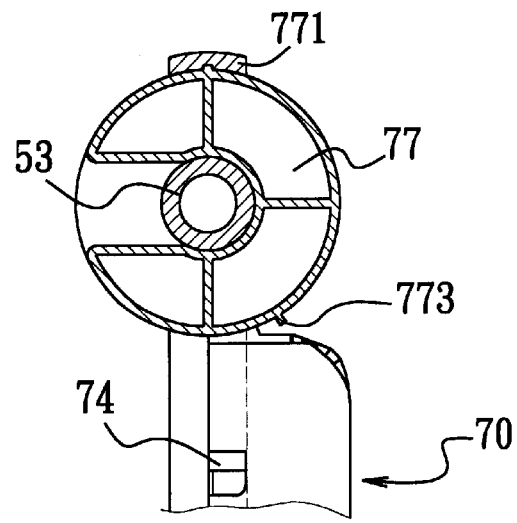
F I G. 4
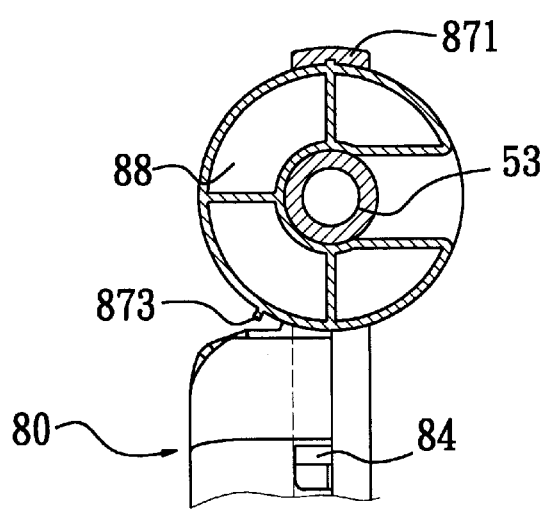
F I G. 5

FOLDABLE STAND WITH ROTATABLE LEGS FOR CAMERA OR MICROPHONE

BACKGROUND OF THE INVENTION

1. Field of the Invention

This invention relates to a stand, more particularly to a foldable stand with rotatable support legs for a camera or microphone.

2. Description of the Related Art

A conventional stand for a camera or microphone generally includes a base, a camera-holding post, and a plurality of support legs. The base generally has an upper base portion defining an axially extending post-receiving chamber, and a lower base portion. The post has a lower post portion telescopically inserted into the post-receiving chamber. The support legs extend downwardly and inclinedly from the lower base portion so as to be disposed on a ground surface when the stand is in use.

One drawback of the aforesaid conventional stand resides in that the support legs are not rotatable relative to the base, thereby limiting the utility range of the conventional stand.

SUMMARY OF THE INVENTION

The object of this invention is to provide a stand for a camera or microphone that is capable of overcoming the aforesaid drawback of the prior art.

According to the invention, a foldable stand for a camera or microphone includes a cylindrical tube unit, a post, a locking device, a positioning element, and first, second and third support legs. The tube unit has an inner wall surface defining an axially extending post-receiving chamber therein, and an outer wall surface. The post is telescopically inserted into the post-receiving chamber so as to be movable relative to the tube unit in an axial direction, and has an upper post section that extends outwardly from the post-receiving chamber. The locking device is mounted on the tube unit for locking the post relative to the tube unit so as to expose a desired length of the upper post section outwardly from the post-receiving chamber. The positioning element is fixed on the tube unit, and has an inner wall confronting and spaced apart from the outer wall surface of the tube unit to define a gap therebetween. The first, second and third support legs are disposed around the tube unit. Each of the support legs has a lower portion adapted to be disposed on. a ground surface, and an upper portion sleeved on the outer wall surface of the tube unit. The upper portions of the first, second and third support legs are vertically aligned along the length of the tube unit. The upper portion of the third support leg is inserted through the gap, and is sleeved rotatably on the outer wall surface of the tube unit in such a manner that the third support leg is rotatable relative to the tube unit. The lower portion of the third support leg is turned to the positioning element while the upper portion of the third support leg releasably engages the positioning element when the stand is disposed at a position of use. The upper portion of the third support leg disengages from the positioning element while the lower portion of the third support leg is turned away from the positioning element when the stand is disposed at a storage position. A tongue-and-groove device is provided for releasably retaining the upper portion of the third support leg on the positioning element when the stand is disposed at the position of use.

BRIEF DESCRIPTION OF THE DRAWINGS

These and other features and advantages of this invention will become apparent in the following detailed description of the preferred embodiment of this invention, with reference to the accompanying drawings, in which:

FIG. 3(B) is an enlarged fragmentary perspective view, illustrating how a first support leg is mounted on a cylindrical tube unit in the preferred embodiment;

FIG. 4 is an enlarged cross-sectional view of the preferred embodiment taken along lines IV—IV in FIG. 1; and FIG. 5 is an enlarged cross-sectional view of the preferred embodiment taken along lines V—V in FIG. 1.

DETAILED DESCRIPTION OF THE PREFERRED EMBODIMENT

Figure 1:
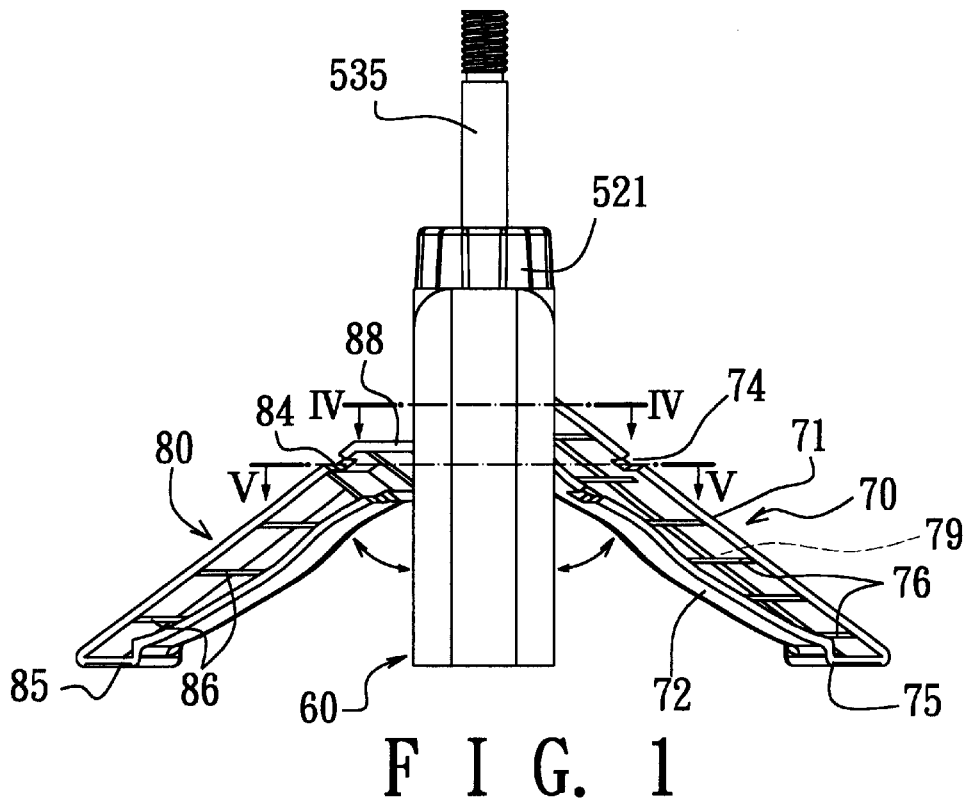
FIG. 1 is a schematic side view of a preferred embodiment of a foldable stand according to the present invention.

Referring to FIGS. 1, 2, 3(A) and 3(B), a preferred embodiment of a foldable stand 500 according to the present invention is adapted to hold a camera or a microphone thereon, and is shown to include a cylindrical tube unit 50, a post 535, a locking device 521, a positioning element 511, and first, second and third support legs 60, 70, 80.

As illustrated, the tube unit 50 has an inner wall surface 53 defining an axially extending post-receiving chamber 530 therein, and an outer wall surface 54.

The post 535 is telescopically inserted into the post-receiving chamber 530 so as to be movable relative to the tube unit 50 in an axial direction, and has an upper post section extending outwardly from the post-receiving chamber 530.

The locking device 521, in the form of an internally threaded nut, is mounted on the tube unit 50 for locking the post 535 relative to the tube unit 50 so as to expose a desired length of the upper post section outwardly from the post-receiving chamber 530. Preferably, the topmost end of the tube unit 50 is formed with an external thread 533, and is split into a plurality of spaced apart pieces 531 which retract inwardly and radially so as to clamp the post 535 tightly therein upon tightening of the locking device 521.

The positioning element 511, preferably an elongated rod, is fixed on the tube unit 50, and has an inner wall 511W confronting with and spaced apart from the outer wall surface 54 of the tube unit 50 to define a gap 55 (see FIG. 3B) therebetween.

Figure 2:
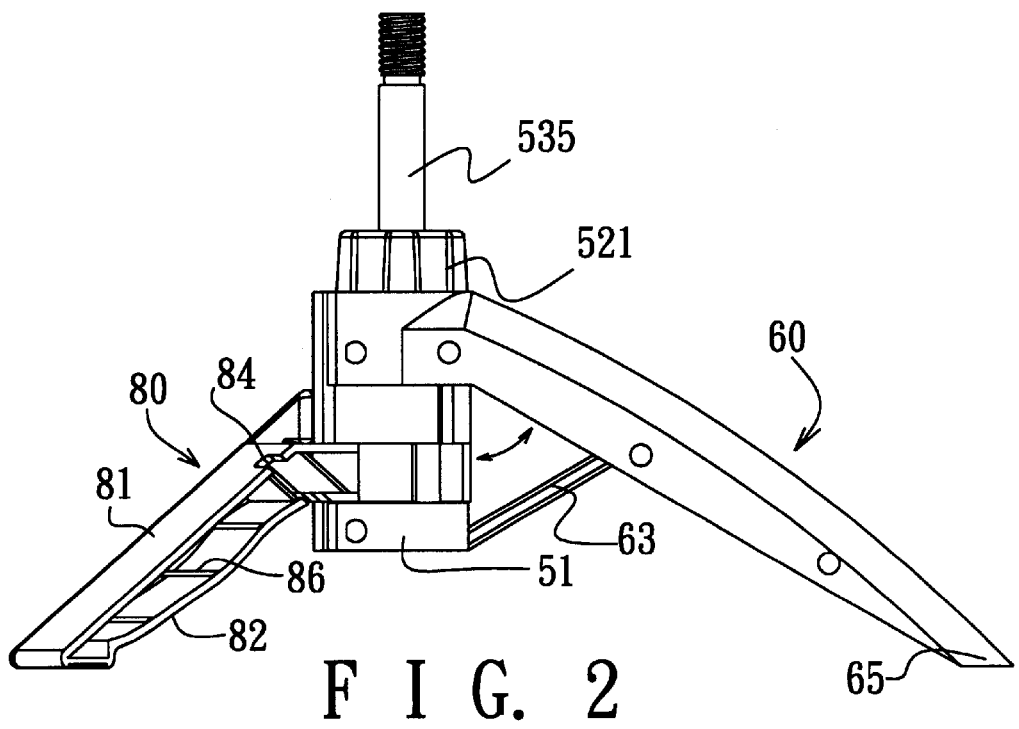
FIG. 2 is a schematic side view of the preferred embodiment when viewed from another angle.
Figure 3A:
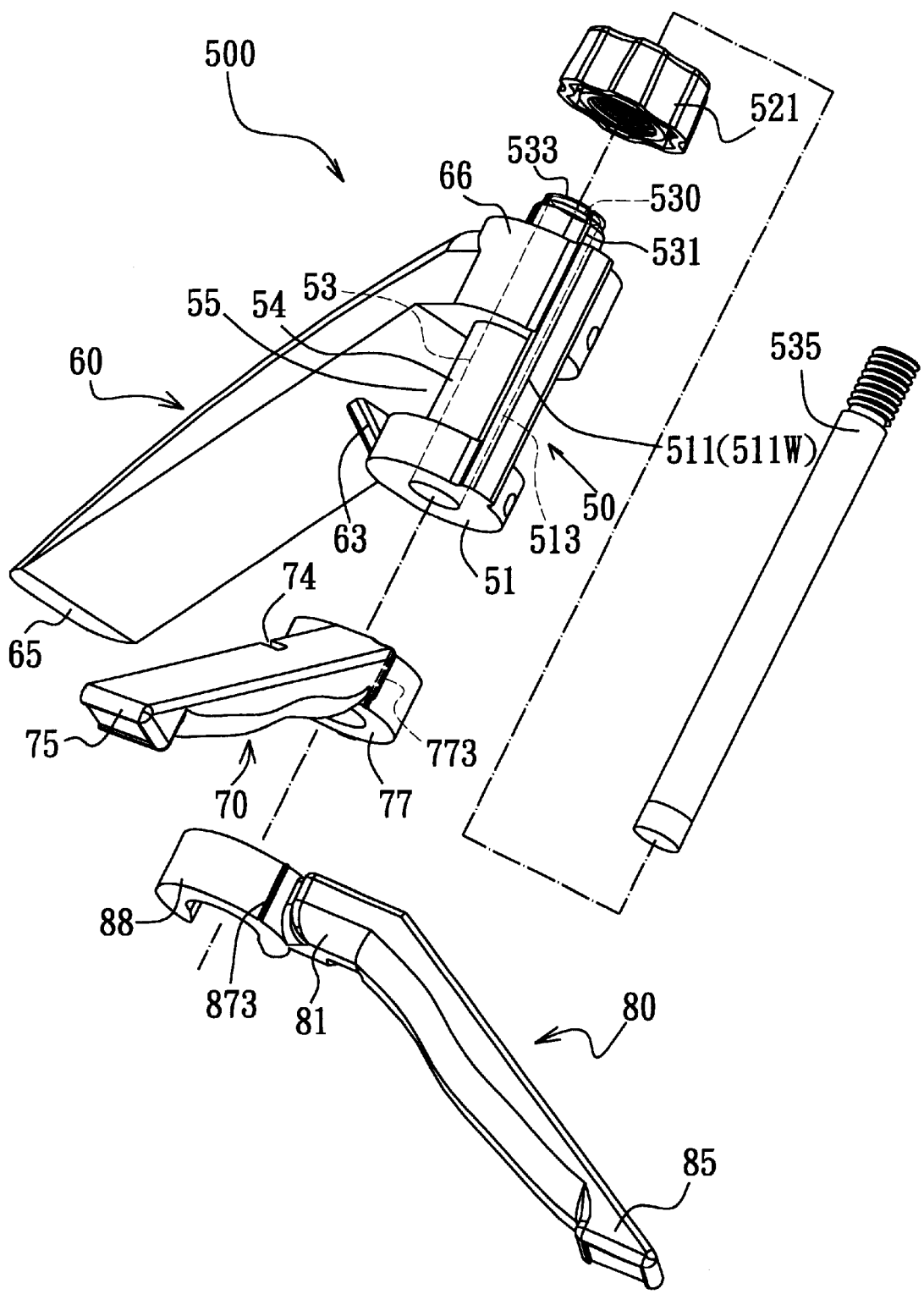
FIG. 3(A) is a perspective exploded view of the preferred embodiment shown in FIGS. 1 and 2.

The first, second and third support legs 60, 70, 80 are disposed around the tube unit 50. Each of the support legs 60, 70, 80 has a lower portion 65, 75, 85 adapted to be disposed on a ground surface, and an upper portion 66, 77, 88 sleeved on the outer wall surface 54 of the tube unit 50. The upper portions 66, 77, 88 of the first, second and third support legs 60, 70, 80 are aligned along the length of the tube unit 50. The upper portion 88 of the third support leg 80 is inserted through the gap 55, and is sleeved rotatably on the outer wall surface 54 of the tube unit 50 in such a manner that the third support leg 80 is rotatable relative to the tube unit 50. The lower portion 85 of the third support leg 80 is turned to the positioning element 511, and the upper portion 88 of the third support leg 80 releasably engages the positioning element 511 when the stand 500 is disposed at a position of use, as best shown in FIGS. 1 and 2. The upper portion 88 of the third support leg 88 disengages from the positioning element 511, and the lower portion 85 of the third support leg 80 is turned away from the positioning element 511 so as to be stacked below the first support leg 60 when the stand 500 is disposed at a storage position, as best shown in FIG. 3(B).

A tongue-and-groove device is provided for releasably retaining the upper portion 88 of the third support leg 80 on the positioning element 511 when the stand 500 is disposed at the position of use.

In this preferred embodiment, the upper portion 77 of the second support leg 70 is also inserted through the gap 55, and is sleeved rotatably on the outer wall surface 54 of the tube unit 50 in such a manner that the second support leg 70 is rotatable relative to the tube unit 50. The lower portion 75 of the second support leg 70 is turned to the positioning element 511, and the upper portion 77 of the second support leg 70 releasably engages the positioning element 511 when the stand 500 is disposed at the position of use. The upper portion 77 of the second support leg 70 disengages from the positioning element 511, and the lower portion 75 of the second support leg 70 is turned away from the positioning element 511 so as to be stacked below the first support leg 60 when the stand 500 is disposed at the storage position.

Preferably, the upper portion 66 of the first support leg 60 is integrally formed with an upper end of the positioning element 511.

When the stand 500 is disposed at the position of use, the first, second, and third support legs 60, 70, 80 are equi-angularly spaced apart from one another, as best shown in FIGS. 1 and 2. Preferably, the outer wall surface 54 of the tube unit 50 includes an annular flange 51 projecting outwardly and radially from and integrally formed with a lower end of the positioning element 511. Under this condition, the upper portions 77,88 of the second and third support legs 70,80 are disposed between the upper portion 66 of the first support leg 60 and the annular flange 51.

The inner wall 511W of the positioning element 511 has an axially extending tongue-retention groove 513. Each of the upper portions 77, 88 of the second and third support legs 70, 80 is formed with a tongue 773, 873 (see FIGS. 4 and 5) which cooperates with the tongue-retention groove 513 to form the tongue-and-groove device and which releasably engages the tongue-retention groove 513 when the stand 500 is disposed at the position of use. The upper portions 77, 88 of each of the second and third support legs 70, 80 further has an additional tongue 771, 871 (see FIGS. 4 and 5) that is spaced apart from the tongue 773, 883 and that releasably engages the tongue-retention groove 513 of the positioning element 511 when the stand 500 is disposed at the storage position.

The tube unit 50 further includes a reinforcing bar 63 interposed between and connecting the first support leg 60 and the annular flange 51 so as to enhance rigidity of the first support leg 60.

Preferably, each of the second and third support legs 70, 80 is a hollow member, and has spaced apart upper and lower plates (71,72), (81,82) extending downwardly and inclinedly from a respective one of the upper portions (77,88), a side plate (79,89) interconnecting the upper and lower plates (71,72), (81,82), and a plurality of spaced apart reinforcing ribs 76, 86 interconnecting the upper and lower plates (71,72), (81,82) so as to enhance rigidity of the same. Each of the second and third support legs 70, 80 further has a pair of upper and lower notches 74, 84 (see FIG. 1) formed in the upper and lower plates (71,72), (81,82) opposite to the side plate 79, 89 and releasably engaging the reinforcing bar 63 when the stand 500 is disposed at the storage position.

Preferably, the first support leg 60 has two opposite side plates 69 which extend downwardly and inclinedly from the upper portion 66 thereof. Each of the second and third support legs 70, 80 has a dimension half of the first support leg 60 in such a manner that the side plates 79, 89 of the second and third support legs 70, 80 are disposed below and are generally flush with the side plates 69 of the first support leg 60 when the stand 500 is disposed at the storage position, as best shown in FIG. 3(B).

With this invention thus explained, it is apparent that numerous modifications and variations can be made without departing from the scope and spirit of this invention. It is therefore intended that this invention be limited only as indicated by the appended claims.

I claim:

1. A foldable stand comprising:

a cylindrical tube unit having an inner wall surface defining an axially extending post-receiving chamber therein, and an outer wall surface;

a post telescopically inserted into said post-receiving chamber so as to be movable relative to said tube unit in an axial direction, and having an upper post section extending outwardly from said post-receiving chamber;

a locking device mounted on said tube unit for locking said post relative to said tube unit so as to expose a desired length of said upper post section outwardly from said post-receiving chamber;

a positioning element fixed on said tube unit, and having an inner wall confronting and spaced apart from said outer wall surface of said tube unit to define a gap therebetween; and first, second and third support legs disposed around said tube unit, each of said support legs having a lower portion adapted to be disposed on a ground surface, and an upper portion sleeved on said outer wall surface of said tube unit, said upper portions of said first, second and third support legs being vertically aligned along the length of said tube unit, said upper portion of said third support leg being inserted through said gap and being sleeved rotatably on said outer wall surface of said tube unit in such a manner that said third support leg is rotatable relative to said tube unit, said lower portion of said third support leg being turned to said positioning element and said upper portion of said third support leg releasably engaging said positioning element when said stand is disposed at a position of use, said upper portion of said third support leg disengaging from said positioning element and said lower portion of said third support leg being turned away from said positioning element when said stand is disposed at a storage position; and a tongue-and-groove device for releasably retaining said upper portion of said third support leg on said positioning element when said stand is disposed at said position of use.

2. The foldable stand as defined in claim 1, wherein said upper portion of said second support leg is inserted through said gap and is sleeved rotatably on said outer wall surface of said tube unit in such a manner that said second support leg is rotatable relative to said tube unit, said lower portion of said second support leg being turned to said positioning element and said upper portion of said second support leg releasably engaging said positioning element when said stand is disposed at said position of use, said upper portion of said second support leg disengaging from said positioning element and said lower portion of said second support leg being turned away from said positioning element when said stand is disposed at said storage position.

3. The foldable stand as defined in claim 2, wherein said upper portion of said first support leg is integrally formed with an upper end of said positioning element.

4. The foldable stand as defined in claim 3, wherein said first, second, and third support legs are equi-angularly spaced apart from one another when said stand is disposed at said position of use.

5. The foldable stand as defined in claim 4, wherein said outer wall surface of said tube unit includes an annular flange projecting outwardly and radially from and integrally formed with a lower end of said positioning element, said upper portions of said second and third support legs being disposed between said upper portion of said first support leg and said annular flange.

6. The stand as defined in claim 5, wherein said inner wall of said positioning element has an axially extending tongue-retention groove, each of said upper portions of said second and third support legs being formed with a tongue which engages said tongue-retention groove when said stand is disposed at said position of use, and which cooperates with said tongue-retention groove to form said tongue-and-groove device.

7. The foldable stand as defined in claim 6, wherein said tube unit further includes a reinforcing bar interposed between and connecting said first support leg and said annular flange so as to enhance rigidity of said first support leg.

8. The stand as defined in claim 7, wherein each of said second and third support legs is a hollow member, and has spaced apart upper and lower plates extending downwardly and inclinedly from a respective one of said upper portions, a side plate interconnecting said upper and lower plates, and a plurality of spaced apart reinforcing ribs interconnecting said upper and lower plates so as to enhance rigidity thereof, each of said second and third support legs having a pair of upper and lower notches formed in said upper and lower plates opposite to said side plate and releasably engaging said reinforcing bar when said stand is disposed at said storage position.

9. The foldable stand as defined in claim 8, wherein said first support leg has a pair of side plates which extend downwardly and inclinedly from said upper portion thereof, each of said second and third support legs having a dimension half of said first support leg in such a manner that said side plates of said second and third support legs are disposed below and are generally flush with said side plates of said first support leg when said stand is disposed at said storage position.

\* \* \* \* \*